United States Patent
Inoue

(10) Patent No.: US 9,298,165 B2
(45) Date of Patent: Mar. 29, 2016

(54) TYPESETTING FIXING METHOD, DISPLAY PLATE AND TIMEPIECE

(71) Applicant: CASIO COMPUTER CO., LTD., Shibuya-ku, Tokyo (JP)

(72) Inventor: Kenichi Inoue, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/732,439

(22) Filed: Jun. 5, 2015

(65) Prior Publication Data

US 2015/0378310 A1    Dec. 31, 2015

(30) Foreign Application Priority Data

Jun. 30, 2014    (JP) .................... 2014-134435

(51) Int. Cl.
*G04B 19/10* (2006.01)
*G04B 19/06* (2006.01)
*B29C 65/00* (2006.01)

(52) U.S. Cl.
CPC .............. *G04B 19/06* (2013.01); *B29C 66/7392* (2013.01); *G04B 19/10* (2013.01)

(58) Field of Classification Search
CPC ..... G04B 19/06; G04B 19/10; B29C 66/7392
USPC .......................................................... 29/10
See application file for complete search history.

(56) References Cited

U.S. PATENT DOCUMENTS

| | | | | |
|---|---|---|---|---|
| 3,197,846 A | * | 8/1965 | Vogt | G04B 19/10 228/160 |
| 3,277,562 A | * | 10/1966 | Huguenin | B29C 45/14311 264/273 |
| 3,451,869 A | * | 6/1969 | Nydegger | G04B 19/103 156/73.1 |
| 5,513,153 A | * | 4/1996 | Thorgersen | G04B 19/065 29/896.32 |
| 5,592,443 A | * | 1/1997 | Kasaya | G04B 19/06 368/223 |
| 6,295,251 B1 | * | 9/2001 | Sakai | G04B 19/10 368/232 |
| 6,698,918 B2 | * | 3/2004 | Durand | G04B 19/10 29/10 |
| 8,506,872 B2 | * | 8/2013 | Hokoda | B29C 65/1635 264/482 |
| 8,947,983 B2 | * | 2/2015 | Stark | G04B 19/103 368/232 |
| 8,964,513 B2 | * | 2/2015 | Derriey | C03C 17/04 368/232 |
| 8,999,217 B2 | * | 4/2015 | Winkler | B21J 1/006 264/264 |
| 2001/0028567 A1 | * | 10/2001 | Akiyama | B29C 66/73921 362/520 |

FOREIGN PATENT DOCUMENTS

JP    2001198982 A    7/2001

* cited by examiner

*Primary Examiner* — Sean Kayes
(74) *Attorney, Agent, or Firm* — Holtz, Holtz & Volek PC

(57) ABSTRACT

A typesetting fixing method includes: disposing a typesetting member on a front surface of a dial plate, the dial plate being made of a transparent or semitransparent resin and the typesetting member being made of an opaque or semitransparent resin having a laser absorbing property; irradiating the dial plate with a laser beam from a rear side of the dial plate while the dial plate is uniformly applied a pressure by a heat-resistant jig; and welding the typesetting member on the dial plate by absorbing the laser beam at an interface of the typesetting member and by melting at least one of the typesetting member and the dial plate by heat.

6 Claims, 10 Drawing Sheets

TYPESETTING FIXING METHOD, DISPLAY PLATE AND TIMEPIECE

CROSS-REFERENCE TO RELATED APPLICATION

This application claims priority based on Japanese Patent Application No. 2014-134435, filed on Jun. 30, 2014, the entire contents of which are incorporated by reference herein.

BACKGROUND OF THE INVENTION

1. Field of the Invention

The present invention relates to a typesetting fixing method, a display plate and a timepiece.

2. Description of the Related Art

On a dial plate for a timepiece, there are numbers or characters representing time and the like, indicators (so-called hour characters) to replace them, various scale marks, symbols, or the like, to be disposed.

These hour characters and the like may be two-dimensionally formed by printing. However, in order to make a high-quality finish, it is preferable to three-dimensionally express them. A "typesetting" method of forming a typesetting member as a separate member and disposing and fixing the typesetting member on a dial plate is widely used.

In the related art, it is general to make a typesetting member of a metal material, and in order to fix a typesetting member, mechanical swaging or bonding is often used.

That is, for example, a typesetting member is fixed by providing a leg on the rear side of the typesetting member, and forming a hole for inserting the leg in a dial plate made of a metal material or a resin material, and disposing the typesetting member on the dial plate, and then fixing the leg on the rear side of the dial plate by mechanical swaging, bonding using an adhesive, or the like.

In this regard, according to recent evolution of a molding technology, it has become possible to make typesetting members which are fine components of resin materials.

In a case of making both of a dial plate and a typesetting member of resin materials, it is possible to fix the typesetting member on the dial plate by various methods of joining resins.

Examples of the methods of joining resins include fixing using an adhesive, thermo compression bonding, and ultrasonic joining.

However, it takes a lot of trouble to fix a fine component by an adhesive, and due to some reason such as extrusion of the adhesive, it may be impossible to make a beautiful finish.

In JP-A-2001-198982, there has been disclosed a method of welding resins by a laser welding technique.

However, a typesetting member is a fine component to be disposed on a dial plate, and on the dial plate of a timepiece, slight flaws such as deformation and burns due to heat and dirt are easy to notice. Therefore, product quality decreases.

In this regard, the method of the related art as described above has an issue that, since fine heat control is impossible, it is difficult to perform stable welding in a fine area of a fine component. And, it is especially difficult to perform welding of a component strongly required to eliminate influence of heat on the external appearance, like a typesetting member of a timepiece.

SUMMARY OF THE INVENTION

The present invention was made in view of the above described circumstances, and an object of the present invention is to provide a typesetting fixing method, a display plate, and a timepiece capable of precisely fixing a typesetting member which is a fine component made of a resin on a dial plate made of a resin.

In order to achieve the above described object, according to an aspect of the present invention, a typesetting fixing method includes: disposing a typesetting member on a front surface of a dial plate, the dial plate being made of a transparent or semitransparent resin and the typesetting member being made of an opaque or semitransparent resin having a laser absorbing property; irradiating the dial plate with a laser beam from a rear side of the dial plate while the dial plate is uniformly applied a pressure by a heat-resistant jig; and welding the typesetting member on the dial plate by absorbing the laser beam at an interface of the typesetting member and by melting at least one of the typesetting member and the dial plate by heat.

In order to achieve the above described object, according to another aspect of the present invention, a display plate includes a dial plate and a typesetting member. The dial plate is made of a transparent or semitransparent resin. The typesetting member is disposed on a front surface of the dial plate and is made of an opaque or semitransparent resin having a laser absorbing property. The dial plate is irradiated with a laser beam from a rear side of the dial plate while the dial plate is uniformly applied a pressure by a heat-resistant jig, the laser beam is absorbed at an interface of the typesetting member. At least one of the typesetting member and the dial plate is melted by heat, whereby the typesetting member is welded on the dial plate.

In order to achieve the above described object, according to another aspect of the present invention, a timepiece includes a display plate. The display plate includes a dial plate and a typesetting member. The dial plate is made of a transparent or semitransparent resin. The typesetting member is disposed on a front surface of the dial plate and is made of an opaque or semitransparent resin having a laser absorbing property. The dial plate is irradiated with a laser beam from a rear side of the dial plate while the dial plate is uniformly applied a pressure by a heat-resistant jig. The laser beam is absorbed at an interface of the typesetting member. At least one of the typesetting member and the dial plate is melted by heat. The typesetting member is welded on the dial plate, whereby the display plate is formed.

BRIEF DESCRIPTION OF THE DRAWING

FIG. 7A is a view of the beam as seen from the above, and FIG. 7B is a view of the beam of FIG. 7A as seen three-dimensionally.

FIG. 8A is a view of the beam as seen from the above, and FIG. 8B is a view of the beam of FIG. 8A as seen three-dimensionally.

DETAILED DESCRIPTION OF THE PREFERRED EMBODIMENT

An embodiment of a typesetting fixing method, a display plate, and a timepiece according to the present embodiment will be described with reference to FIGS. 1 to 8.

Also, although the after-mentioned embodiments are provided with various technically preferred limitations to perform the present invention, the scope of the present invention is not limited to the following embodiments and illustrated examples.

Figure 1:
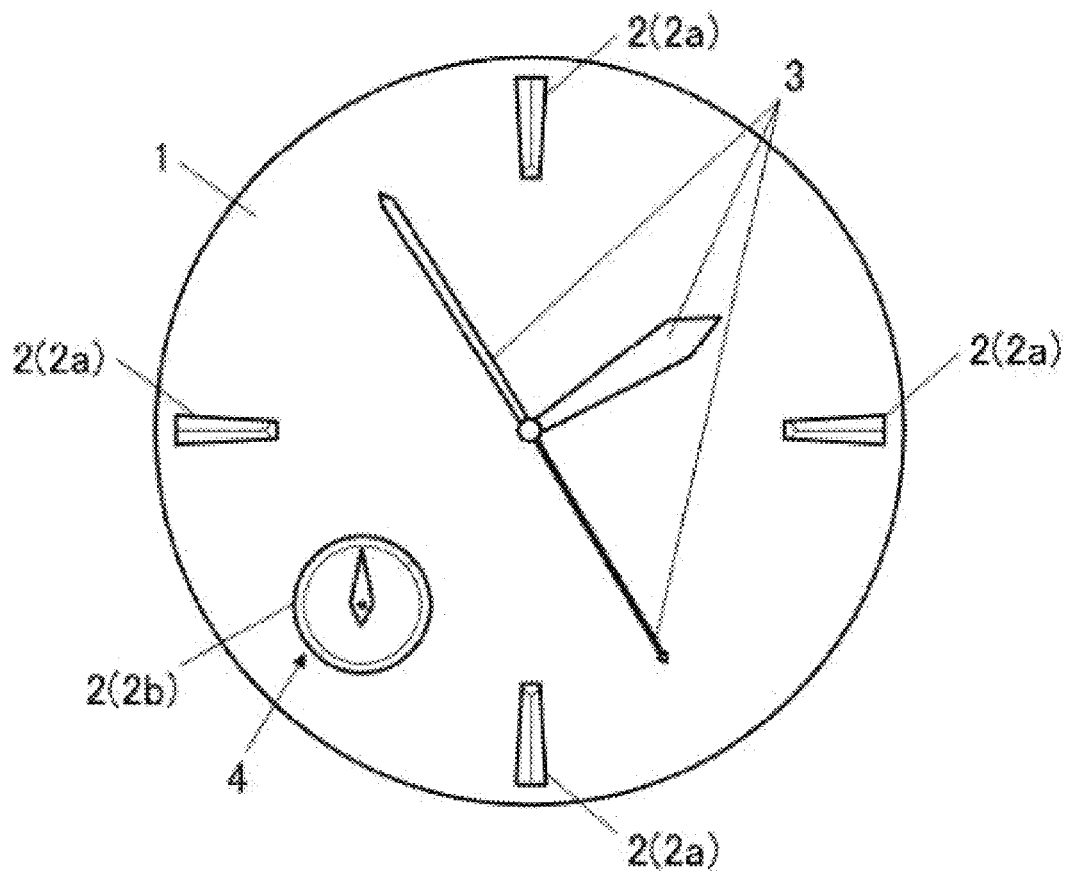
FIG. 1 is a plan view of a display plate according to the present embodiment.

FIG. 1 is a plan view of a display plate of a timepiece according to the present embodiment.

As shown in FIG. 1, the display plate of the present embodiment has a dial plate 1 and typesetting members 2.

In the present embodiment, the dial plate 1 is made of a transparent or semitransparent resin.

The material which forms the dial plate 1 is specifically acrylic resin (methacrylic resin, or PMMA such as polymethyl methacrylic acid or polymethyl methacrylate) or polycarbonate resin (PC), for example. And, it is preferable that its light transmittance is 20% or more.

Also, the typesetting members 2 are disposed on the front surface of the dial plate 1, and are indicated, for example, by hands 3. The typesetting members 2 include typesetting members 2a and typesetting members 2b. The typesetting members 2a indicates hour characters which three-dimensionally express numbers or characters representing time and the like, indicators (so-called hour characters) to replace them, and the like. The typesetting members 2b indicates decoration which three-dimensionally express a ring, scale marks, symbols, and the like to be provided around a small display section 4 for displaying various information and at other positions.

The typesetting members 2 are made of an opaque or semitransparent resin having a laser absorbing property.

It is preferable that the material which forms the typesetting members 2 may be an opaque material having relatively excellent heat resistance and absorbing visible light, specifically, for example, polycarbonate resin (PC) or ABS resin. It is preferable that its light transmittance may be 20% or less.

Figure 2A:
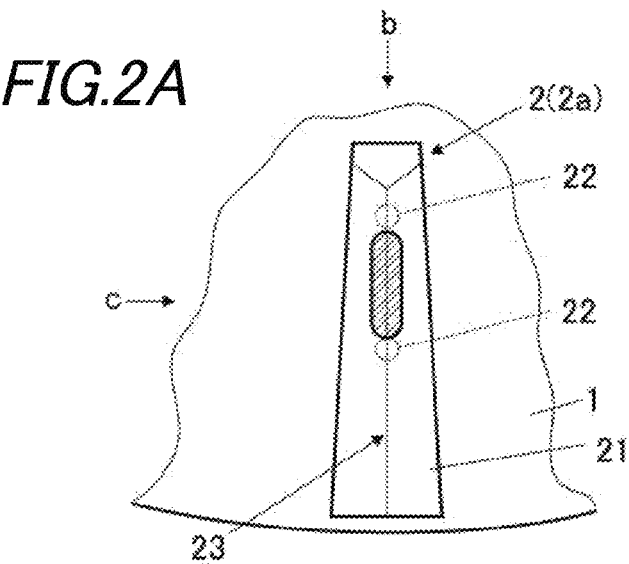
FIG. 2A is an enlarged view of a typesetting member and the surrounding dial plate.
Figure 2B:
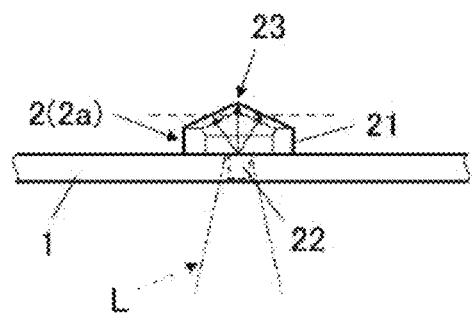
FIG. 2B is a front view of the typesetting member as seen from an arrow b direction of FIG. 2A.
Figure 2C:
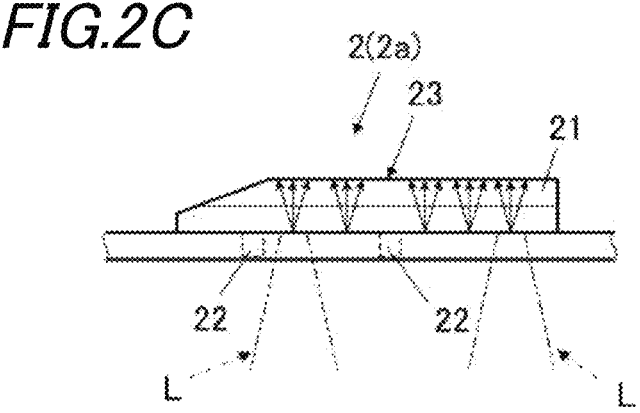
FIG. 2C is a side view of the typesetting member as seen from an arrow c direction of FIG. 2A.

FIG. 2A is an enlarged view of a typesetting member shown in FIG. 1 and the surrounding dial plate, and FIG. 2B is a front view of the typesetting member as seen from an arrow b direction of FIG. 2A, and FIG. 2C is a side view of the typesetting member as seen from an arrow c direction of FIG. 2A.

Figure 3A:
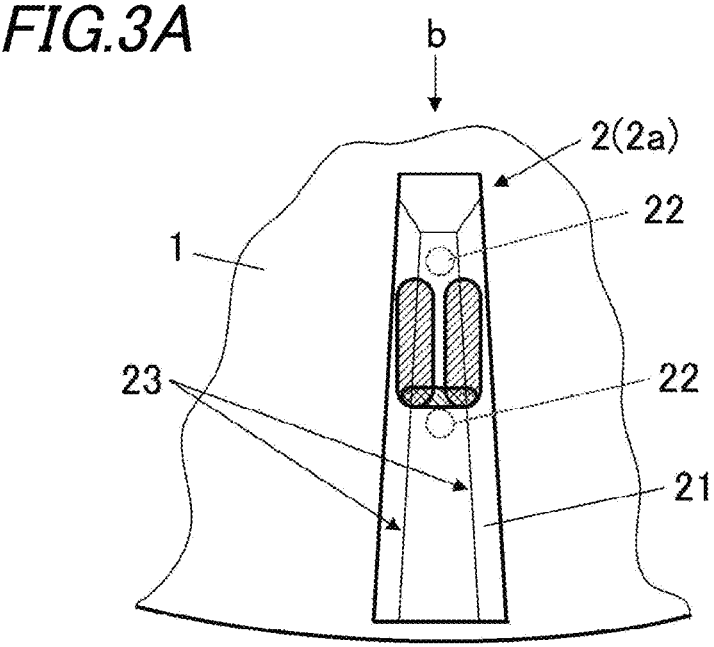
FIG. 3A is an enlarged view of a modification of the typesetting member and the surrounding dial plate.
Figure 3B:
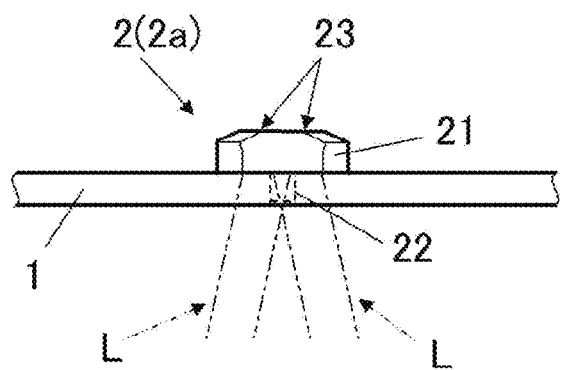
FIG. 3B is a front view of the typesetting member as seen from an arrow b direction of FIG. 3A.
Figure 4A:
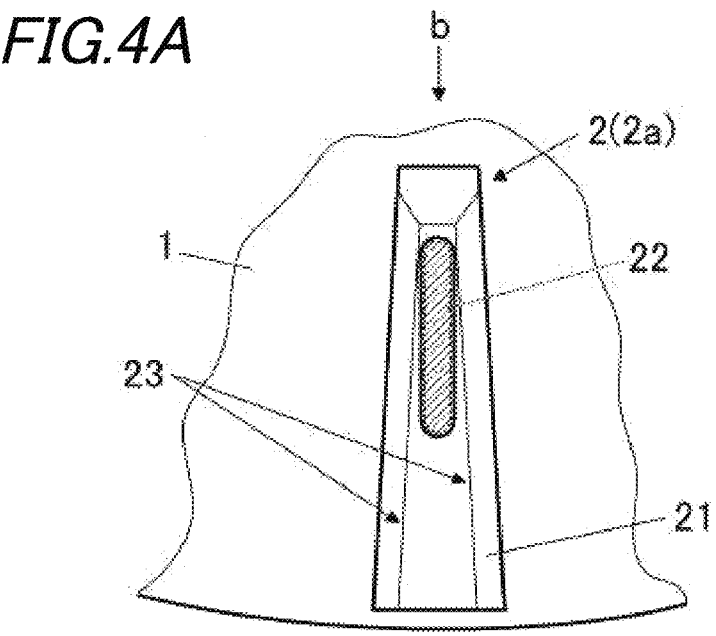
FIG. 4A is an enlarged view of another modification of the typesetting member and the surrounding dial plate.
Figure 4B:
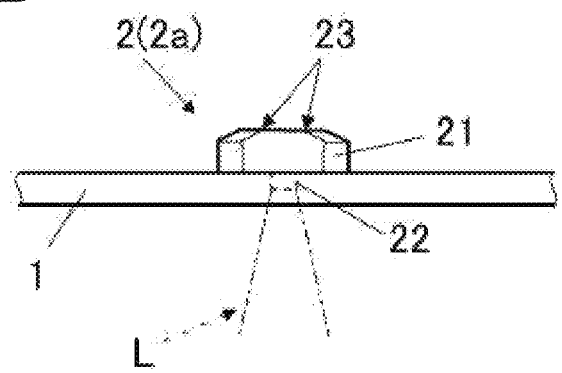
FIG. 4B is a front view of the typesetting member as seen from an arrow b direction of FIG. 4A.
Figure 5A:
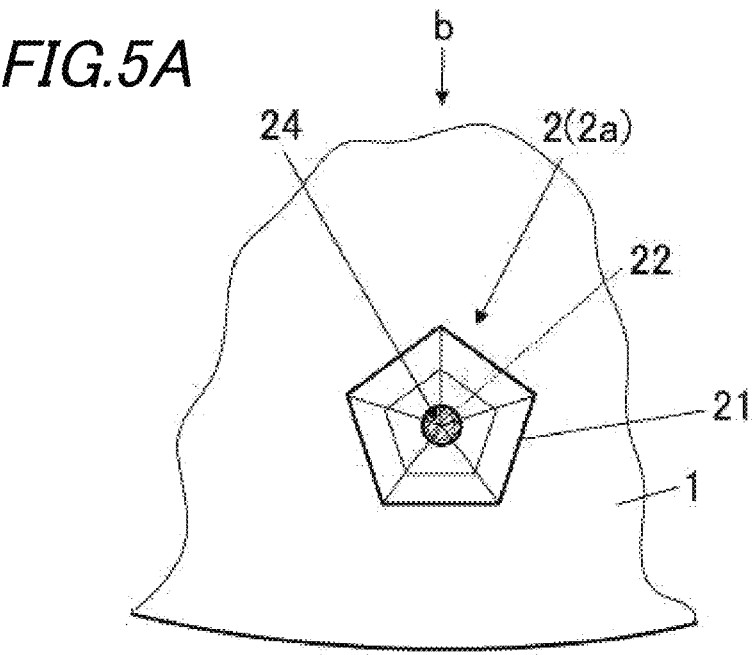
FIG. 5A is an enlarged view of another modification of the typesetting member and the surrounding dial plate.
Figure 5B:
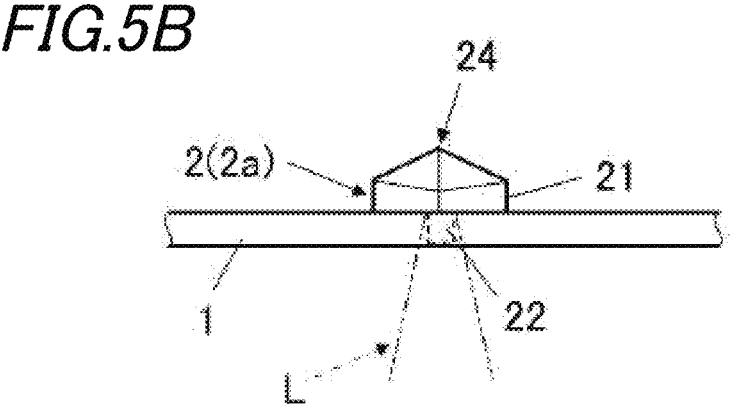
FIG. 5B is a front view of the typesetting member as seen from an arrow b direction of FIG. 5A.

Also, FIGS. 3A, 4A, and 5A are enlarged views of modifications of the typesetting member and the surrounding dial plates, and FIGS. 3B, 4B, and 5B are front views of the typesetting members as seen from arrow b directions of FIGS. 3A, 4A, and 5A, respectively.

As shown in FIGS. 2A to 2C, a typesetting member 2 consists of a main body portion 21, and a leg 22 which is provided on the rear side of the main body portion 21.

Also, the shapes and number of legs 22 are not limited to the illustrated examples.

Also, it is not essential for the typesetting member 2 to have the leg 22, and the leg 22 may not be provided.

In a case where the typesetting member 2 has the leg 22, in the dial plate 1, a hole for fitting the leg 22 is formed.

Also, the hole may be a through-hole, or may be a recess which does not penetrating through the dial plate.

Since the leg 22 is provided on the typesetting member 2 and the hole for fitting the leg 22 is formed in the dial plate 1, positioning of the typesetting member 2 becomes easy.

Also, on the top surface of a typesetting member 2a of the present embodiment, a crest line 23 is provided along a longitudinal direction, and thus the typesetting member 2a has an inverted V shape as seen in a front view (see FIG. 2B).

Here, the crest line 23 means a portion where surfaces intersect with each other and which is higher than the other portion.

Also, in the present embodiment, not only a portion where inclined surfaces intersect with each other as shown in FIG. 2B or the like, but also a portion where an inclined surface and a flat surface intersect with each other, for example, as shown in FIGS. 3B and 4B are defined as crest lines 23.

Also, in a case where there is a point higher than the other portion as shown in FIGS. 5A and 5B, the corresponding point is defined as an apex 24.

Figure 6:
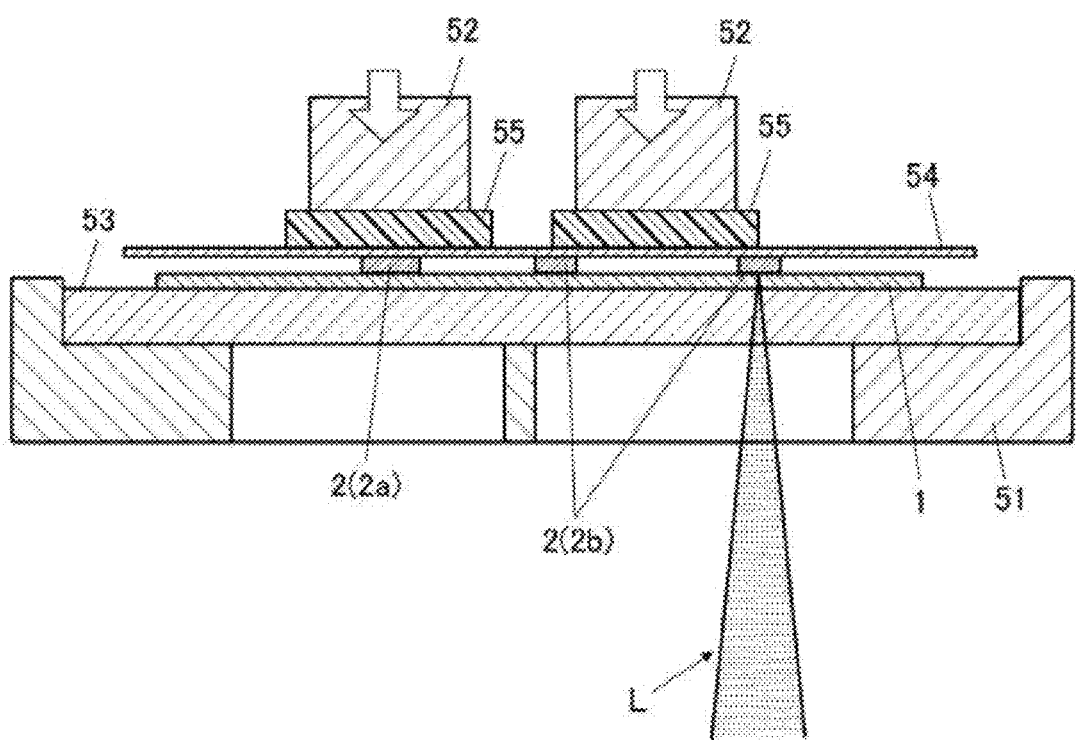
FIG. 6 is a cross-sectional view of a main portion for explaining a typesetting fixing method according to the present embodiment.

FIG. 6 is a cross-sectional view of a main portion for explaining a typesetting fixing method according to the present embodiment, and roughly shows a device configuration for realizing a display plate of the present embodiment.

A device for realizing the typesetting fixing method according to the present embodiment specifically includes a support member 51, a pressing member 52 and a pressure uniformizing jig 53 as shown in FIG. 6. The support member 51 supports the dial plate 1 and the typesetting members 2. The pressing member 52 presses the dial plate 1 and the typesetting members 2. The pressure uniformizing jig 53 uniformizes a pressure to be applied by the pressing member 52.

The pressure uniformizing jig 53 needs to be able to transmit a laser beam L and withstand heat which is generated during laser welding. For example, flat-plate-like transparent heat-resistant glass can be applied.

By applying a pressure through the pressure uniformizing jig 53, it is possible to press the dial plate 1 and the typesetting members 2 in a plane, and it is possible to perform laser welding while applying a uniform pressure to the typesetting members 2.

Here, it is preferable that the uniform pressure may be a pressure with a uniformity ratio of 80% or more. It is preferable that its power may be 0.1 N to 5 N.

On the occasion of fixing the typesetting members 2 on the dial plate 1, the typesetting members 2 are disposed on the front surface of the dial plate 1, and a protective sheet 54 is disposed on the typesetting members 2 positioned on the front side of the dial plate 1 and to be fixed. The protective sheet 54 protects the front surfaces of the dial plate 1 and the typesetting members 2.

Further, a cushioning member 55 is disposed on the front side of the typesetting members 2, and a pressure is applied through the cushioning member 55 by the pressing member 52.

As the cushioning member 55, for example, silicon rubber can be used.

In the present embodiment, the dial plate is irradiated with a laser beam L from the rear side of the dial plate 1 while the dial plate is uniformly applied a pressure by the heat-resistant jig as described above, whereby the laser beam L is absorbed at the interfaces of the typesetting members 2. The typesetting members 2 or/and the dial plate 1 are melted by heat, whereby the typesetting members 2 are welded on the dial plate 1.

In the present embodiment, it is preferable that the irradiation condition (output condition) of the laser beam L may be set such that its wavelength is 390 nm to 1200 nm, and its power is 0.1 W to 10.0 W (more preferably, 5.0 W to 8.0 W), its repetition frequency is 1 kHz to 500 kH, and its scan speed is about 1 mm/s to 100 mm/s.

Also, it is preferable that the beam shape of the laser beam L may be a beam shape with a uniform distribution having no peak, not a general Gaussian distribution shape having a peak at a central portion.

Figure 7A:
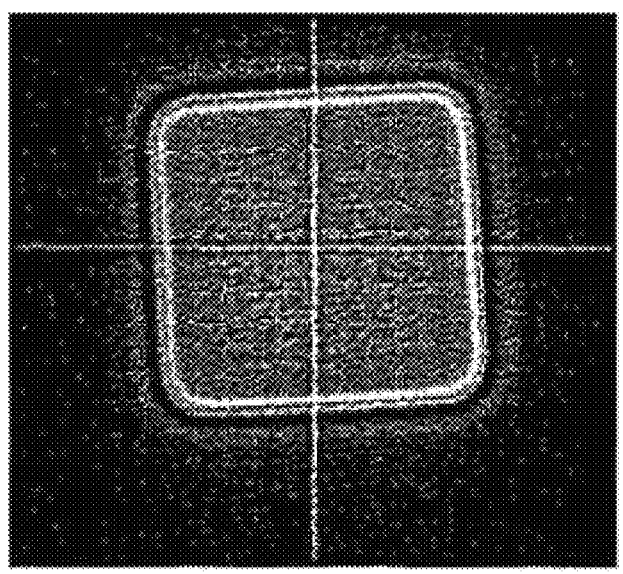
FIGS. 7A and 7B are views illustrating an example of the beam shape of a laser beam.
Figure 7B:
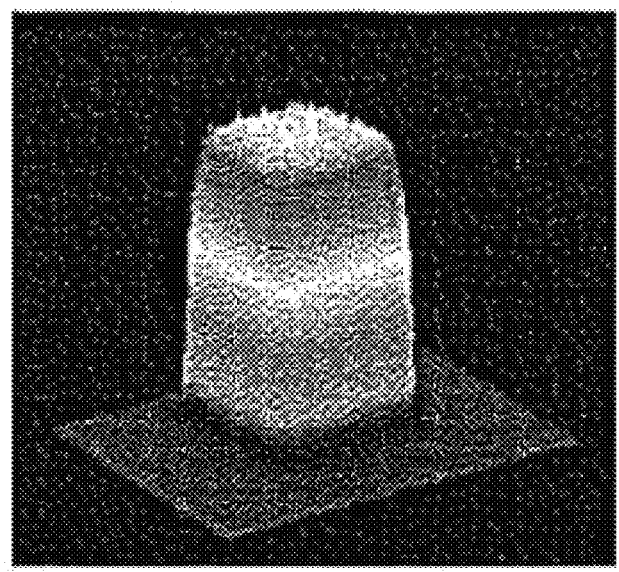
Figure 8A:
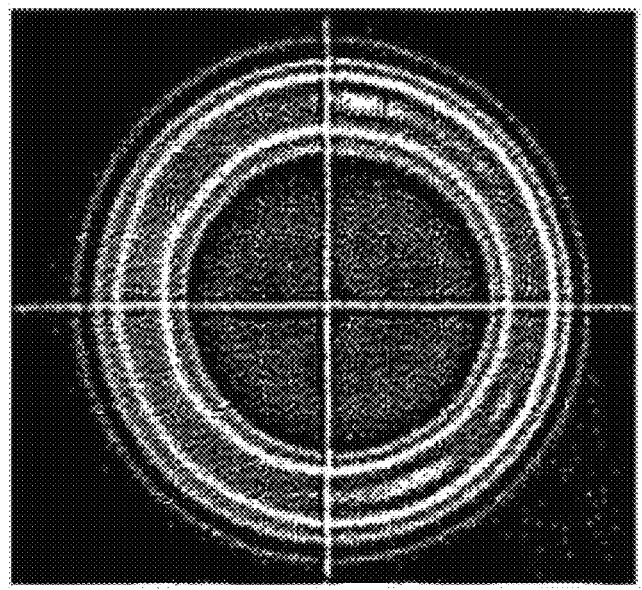
FIGS. 8A and 8B are views illustrating another example of the beam shape of the laser beam.
Figure 8B:
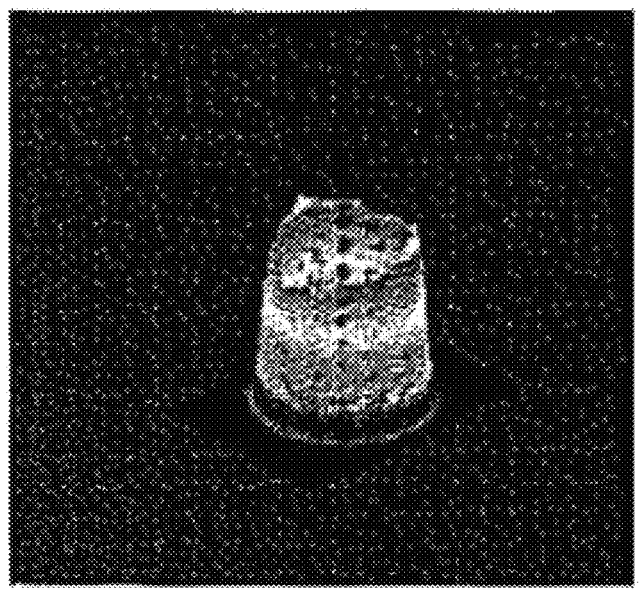

FIGS. 7A and 8A are views of examples of a beam having no peak as seen from the above, and FIGS. 7B and 8B are views of the beams shown in FIGS. 7A and 8A as seen three-dimensionally.

It is preferable to use a beam having a small shape with a high uniformity ratio, for example, like a top hat shape shown in FIGS. 7A and 7B or a ring shape shown in FIGS. 8A and 8B, as the beam shape of the laser beam L.

The beam shape of the laser beam L is determined by adjusting the structure of a resonator (cavity) which is included in a laser generating device (not shown) and where a laser oscillates, and beam diffraction (for example, the size of a beam output terminal and a wavelength).

In a case of irradiation with the laser beam L, it is necessary to prevent an influence of heat which is generated by absorption of the laser beam L from exhibiting on the viewable side of the typesetting members 2 (that is, the front surfaces of the typesetting members 2), to the utmost. And, to that end, it is preferable to secure a distance from the interfaces of the typesetting members 2 to be melted by the laser beam L to the front surfaces of the typesetting members 2, in the irradiation direction of the laser beam L, as much as possible.

For example, in a case where the typesetting members 2 has a thick portion, it is preferable to set the thick portion as a position to be irradiated with the laser beam L.

In the present embodiment, a thick portion means a portion thick in the irradiation direction of the laser beam L.

For example, in a case where a typesetting member 2 has a leg 22 extending in the longitudinal direction as shown in FIG. 4A, the portion where there is the leg 22 is a thick portion thick in the typesetting members 2 (thick in the irradiation direction of the laser beam L).

It is preferable that irradiation with the laser beam L may be performed along the leg 22.

Also, even in a case where the leg 22 is thin as shown in FIG. 2A, in a case where it is possible to fix the typesetting member 2 only by melting the corresponding portion, spot welding may be performed by irradiating the corresponding leg 22 with the laser beam L.

Also, in a case where it is possible to provide a thick portion other than a leg 22 as design of a typesetting member 2, the corresponding thick portion is irradiated with the laser beam L.

Also, in a case where a typesetting member 2 has a crest line 23 as shown in FIGS. 2A and 3A, or in a case where a typesetting member 2 has an apex 24 as shown in FIG. 5A, it is preferable that the crest line 23 or the apex 24 may be irradiated with the laser beam L.

Since a portion where the crest line 23 or the apex 24 is provided is the highest portion of the corresponding typesetting member 2, if this portion is irradiated with the laser beam L, it is possible to secure the irradiation distance of the laser beam L.

In FIGS. 2A, 3A, 4A, and 5A, portions which are melted by irradiation with the laser beam L are shown by diagonal meshes.

In a case where two crest lines 23 are provided as shown in FIG. 3A, the laser beam L may be reciprocated with respect to each crest line 23, or each crest line 23 and a portion connected to the corresponding crest line may be scanned in a U shape with the laser beam L.

In the case of performing scan in a U shape with the laser beam L, with respect to a portion connected to each crest line 23, it is preferable to minimize a portion to be melted, for example, by increasing the movement speed of the scan or decreasing the power of the laser beam L.

Also, in the case where two crest lines 23 are provided, it is preferable to change an irradiation angle when each crest line 23 is irradiated with the laser beam L, thereby performing irradiation from the obliquely lower direction, as shown in FIG. 3B.

By doing this, it is possible to further secure the irradiation distance to each crest line 23.

In FIGS. 2B and 2C, a heat diffusion state in a typesetting member 2 in a case of irradiating the crest line 23 with the laser beam L is shown by arrows.

As shown in FIGS. 2B and 2C, in the case of irradiating the crest line 23 with the laser beam L, heat diffuses around the crest line 23 which is a relatively thick portion, and thus it is possible to suppress thermal influence from exhibiting on the front surface of the typesetting member 2.

Next, the typesetting fixing method according to the present embodiment will be described.

In the present embodiment, in a case of fixing the typesetting members 2 on the dial plate 1, as shown in FIG. 6, heat-resistant glass or the like which is the pressure uniformizing jig 53 is mounted on the support member 51, and on it, the dial plate 1 having the typesetting members 2 mounted thereon is mounted.

Thereafter, on the typesetting members 2 positioned on the front side of the dial plate 1 and to be fixed, the protective sheet 54 for protecting the front surfaces of the dial plate 1 and the typesetting members 2 is disposed, and the cushioning member 55 is disposed on the front side of the typesetting members 2, and pressing is performed through the cushioning member 55 by the pressing member 52.

A laser radiation device (not shown) adjusts the beam shape of a laser beam L to be radiated to a shape having no peak, and radiates the laser beam L onto thick portions of the typesetting members 2 such as portions where the crest lines 23 or the apexes 24 or the legs 22 are provided.

As a result, in a state where a pressure is uniformly applied, irradiation with the laser beam L from the rear side of the dial plate 1 is performed, whereby the laser beam L is absorbed at the interfaces of the typesetting members 2, and the typesetting members 2 or/and the dial plate 1 are melted by heat, whereby the typesetting members 2 are welded on the dial plate 1.

In this case, heat generated by the laser welding diffuses in the relatively thick portions of the typesetting members 2, and thus the influence of the heat on the front surfaces of the typesetting members 2 is suppressed.

As described above, according to the present embodiment, the typesetting members 2 made of an opaque or semitransparent resin having a laser absorbing property are disposed on the front surface of the dial plate 1 made of a transparent or semitransparent resin, the dial plate 1 is irradiated with a laser beam L from the rear side of the dial plate 1 while the dial plate 1 is uniformly applied a pressure by the pressure uniformizing jig 53 which is a heat-resistant jig.

As a result, the laser beam L is absorbed at the interfaces of the typesetting members 2, and the typesetting members 2 or/and the dial plate 1 are melted by heat, whereby the typesetting members 2 are welded on the dial plate 1.

Like this, since laser welding is performed in a state where a pressure is uniformly applied, it is possible to uniformly disperse the influence of heat generated by the laser welding, and it is possible to prevent an influence of the heat on the front surfaces (that is, the viewable side) of the typesetting members 2, and form the dial plate 1 having the high-quality typesetting members 2 (upright indexes).

Also, since the typesetting members 2 are fixed by thermal welding using irradiation with a laser beam L, it is possible to remarkably improve impact resistant performance as compared to any other fixing method such as fixing using an adhesive.

Also, portions which are thick in the typesetting members 2 and where there are the legs 22, the crest lines 23, or the apexes 24 are irradiated with the laser beam L.

Therefore, it is possible to secure the irradiation distance of the laser beam L, and it is possible to suppress an influence of heat which is generated by laser welding from exhibiting on the front surfaces (that is, viewable side) of the typesetting members 2.

Also, in a case where the typesetting members 2 have crest lines 23 or apexes 24, even if dirt or the like exhibits due to an influence of heat caused by irradiation with the laser beam L, the dirt or the like is inconspicuous as compared to a case of forming the front surfaces of the typesetting members 2 flat, and it is possible to realize typesetting excellent in designability.

Further, since the beam shape of the laser beam L is adjusted to a top hat shape having no peak at a center portion, or the like, as compared to a case of using a laser beam L having a Gaussian distribution shape, it becomes difficult for the influence of heat caused by the irradiation with the laser beam L to be focused on one point, and thus it is possible to further reduce the influence of the heat on the front surfaces (that is, viewable side) of the typesetting members 2.

Also, although the embodiment of the present invention has been described, it goes without saying that the present invention is not limited to such embodiment and various modifications can be made without departing from the scope of the present invention.

For example, in the present embodiment, a case of performing irradiation with the laser beam L from the side directly below the typesetting members 2 has been exemplified. However, the irradiation direction of the laser beam L is not limited thereto.

Figure 9A:
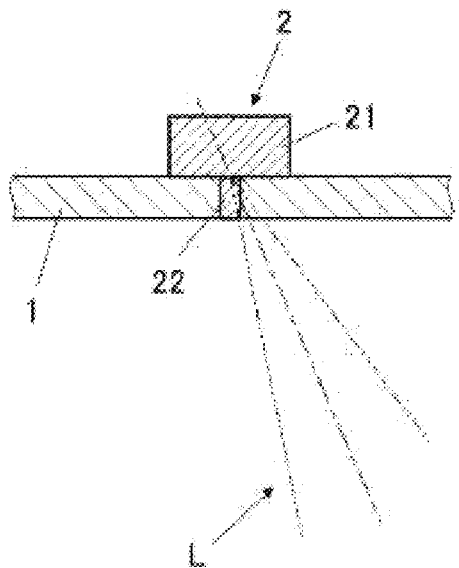
FIGS. 9A to 9C are cross-sectional views of a main portion for explaining a modification of the typesetting fixing method according to the present embodiment.
Figure 9B:
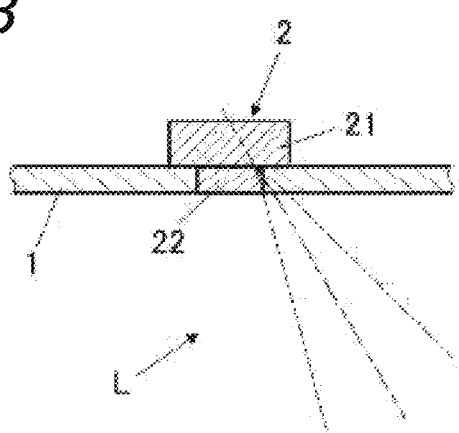
Figure 9C:
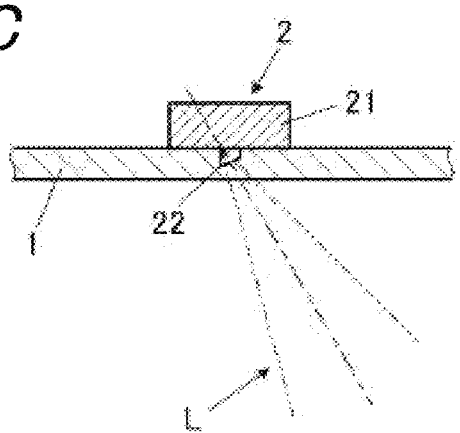

For example, in a case of radiating the laser beam L toward the leg 22 of a typesetting member 2, as shown in FIGS. 9A to 9C, irradiation with the laser beam L from the obliquely lower side of the leg 22 may be performed.

In a case of performing irradiation with the laser beam L from the obliquely lower side as described above, it is possible to secure a longer distance to the front surface of the typesetting member 2 as compared to a case of performing irradiation with the laser beam L from the side directly below the typesetting member, and it is possible to suppress an influence of heat on the front surface of the typesetting member 2.

Also, in this case, as shown in FIG. 9C, a portion to be irradiated with the laser beam L (in FIG. 9C, the leg 22 of the typesetting member 2) may be cut obliquely according to the irradiation angle of the laser beam L.

If the incident angle of the laser beam L to an irradiation target is set to a substantially right angle, it is possible to efficiently diffuse heat.

Figure 10A:
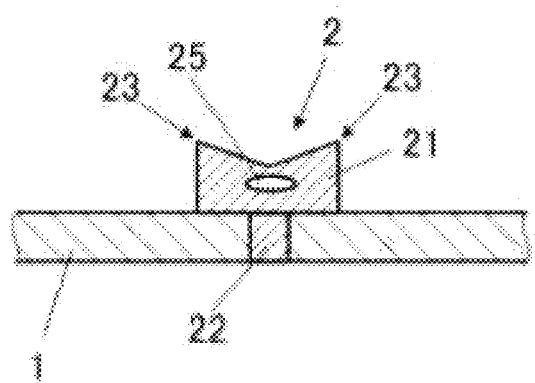
FIGS. 10A and 10B are cross-sectional views of main portions of modifications of the typesetting member according to the present embodiment.

Also, for example, in a case where it is desired to fix a typesetting member 2 designed to have a recess at the central portion on the dial plate 1 as shown in FIG. 10A, in a thin portion, a cavity may be formed in the typesetting member 2, whereby an air layer 25 may be provided.

Like this, since the air layer 25 is provided inside the typesetting member 2, it is possible to suppress transmission of heat caused by irradiation with the laser beam L, and it is possible to suppress dirt and burns attributable to influence of heat from exhibiting on the front surface (viewable side) of the typesetting member 2.

Also, since the heat insulation structure is provided inside the typesetting member 2, it has no influence on the external appearance of the typesetting member 2.

Figure 10B:
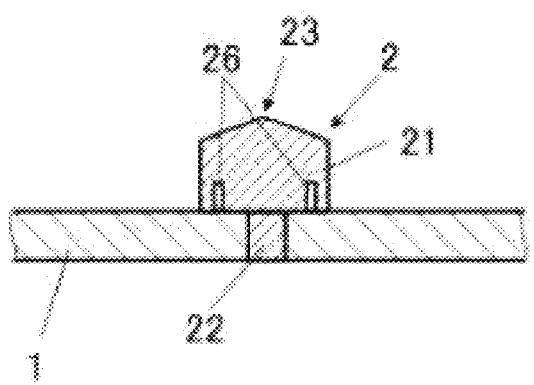

Also, for example, as shown in FIG. 10B, slits 26 may be formed in the side portions of the lower side of a typesetting member 2.

In some cases such as a case where the width of a typesetting member 2 is narrow, it is feared that the thermal influence of the laser beam L may exhibit at the side portions of the typesetting member 2.

In this regard, in a case of forming slits 26 in the side portions of the typesetting member 2, in these portions, heat insulating layers are formed by air. Therefore, it is possible to suppress heat transmission, and it is possible to suppress dirt and burns attributable to influence of heat from exhibiting on the front surface (viewable side) of the typesetting member 2.

Also, even in this case, since the heat insulation structures are provided in internal portions of the typesetting member 2 hidden by the dial plate 1, they have no influence on the external appearance of the typesetting member 2.

Also, in the present embodiment, an example using a laser beam L having a beam shape having no peak in the center portion has been described. However, the beam shape of the laser beam L is not limited thereto.

For example, in a case where an irradiation distance to the front surface of a typesetting member 2 is sufficiently secured, or in a case of providing a heat insulation structure inside a typesetting member 2, the beam shape of the laser beam L may be set to a general Gaussian distribution shape.

Also, in the present embodiment, as the pressure uniformizing jig 53, heat-resistant glass which transmits a laser beam L is used. However, the pressure uniformizing jig 53 is not limited thereto.

For example, even a member which does not transmit a laser beam L can be applied as the pressure uniformizing jig if a hole is formed on the route of the laser beam L.

Though several embodiments of the present invention have been described above, the scope of the present invention is not limited to the above embodiments, and includes the scope of inventions, which is described in the scope of claims, and the scope equivalent thereof.

What is claimed is:

1. A typesetting fixing method comprising:
disposing a typesetting member on a front surface of a dial plate,
wherein the dial plate is made of a transparent or semitransparent resin and the typesetting member is made of an opaque or semitransparent resin having a laser absorbing property;
irradiating the dial plate with a laser beam from a rear side of the dial plate while the dial plate is uniformly applied a pressure by a heat-resistant jig; and
welding the typesetting member on the dial plate (i) by absorbing the laser beam at an interface of the typesetting member and (ii) by melting at least one of the typesetting member and the dial plate by heat.

2. The typesetting fixing method according to claim 1, wherein:
a thick portion is provided in the typesetting member, and
a portion which is irradiated with the laser beam is the thick portion.

3. The typesetting fixing method according to claim 1, wherein:
an apex or a crest line is provided in the typesetting member, and
the apex or the crest line is irradiated with the laser beam.

4. The typesetting fixing method according to claim 1, wherein:
the laser beam has a beam shape having no peak in a center portion of the laser beam.

5. A display plate comprising:
a dial plate that is made of a transparent or semitransparent resin; and
a typesetting member that is disposed on a front surface of the dial plate and that is made of an opaque or semitransparent resin having a laser absorbing property,
wherein the dial plate is irradiated with a laser beam from a rear side of the dial plate while the dial plate is uniformly applied a pressure by a heat-resistant jig, the laser beam is absorbed at an interface of the typesetting member, at least one of the typesetting member and the dial plate is melted by heat, whereby the typesetting member is welded on the dial plate.

6. A timepiece comprising:
a display plate includes:
a dial plate that is made of a transparent or semitransparent resin; and
a typesetting member that is disposed on a front surface of the dial plate and that is made of an opaque or semitransparent resin having a laser absorbing property,
wherein the dial plate is irradiated with a laser beam from a rear side of the dial plate while the dial plate is uniformly applied a pressure by a heat-resistant jig, the laser beam is absorbed at an interface of the typesetting member, at least one of the typesetting member and the dial plate is melted by heat, the typesetting member is welded on the dial plate, whereby the display plate is formed.

* * * * *